(12) United States Patent
Todorovic et al.

(10) Patent No.: US 7,938,934 B2
(45) Date of Patent: May 10, 2011

(54) ASA EMULSIFICATION WITH ULTRASOUND

(75) Inventors: Aleksandar Todorovic, Helsinki (FI); Tommy Jacobson, Helsinki (FI)

(73) Assignee: Nalco Company, Naperville, IL (US)

( * ) Notice: Subject to any disclaimer, the term of this patent is extended or adjusted under 35 U.S.C. 154(b) by 125 days.

(21) Appl. No.: 12/367,711

(22) Filed: Feb. 9, 2009

(65) Prior Publication Data

US 2009/0139676 A1    Jun. 4, 2009

Related U.S. Application Data

(63) Continuation-in-part of application No. 11/779,068, filed on Jul. 17, 2007, now Pat. No. 7,785,442, which is a continuation-in-part of application No. 11/339,169, filed on Jan. 25, 2006, now Pat. No. 7,550,060.

(51) Int. Cl.
*D21H 11/00* (2006.01)
(52) U.S. Cl. .................................. 162/164.6; 162/158
(58) Field of Classification Search ............... 162/164.6, 162/158, 202, 336, 183, 175
See application file for complete search history.

(56) References Cited

U.S. PATENT DOCUMENTS

| | | | | |
|---|---|---|---|---|
| 3,102,064 | A * | 8/1963 | Mazzarella et al. | .......... 162/158 |
| 3,428,520 | A | 2/1969 | Yiannos | |
| 4,127,233 | A | 11/1978 | Maciaszek | |
| 4,529,447 | A * | 7/1985 | Okada et al. | .............. 106/287.24 |
| 5,466,063 | A | 11/1995 | Poyet et al. | |
| 6,659,636 | B1 | 12/2003 | Matula | |
| 2003/0102095 | A1 * | 6/2003 | Hill et al. | .......................... 162/72 |
| 2003/0205167 | A1 * | 11/2003 | Dilts et al. | ..................... 106/219 |
| 2004/0040679 | A1 | 3/2004 | Kilgannon et al. | |
| 2004/0050514 | A1 * | 3/2004 | Shannon et al. | .............. 162/158 |
| 2004/0055869 | A1 | 3/2004 | Moore | |
| 2004/0222239 | A1 | 11/2004 | Hayduk | |
| 2004/0238455 | A1 | 12/2004 | Leino | |
| 2005/0224202 | A1 * | 10/2005 | Sundberg et al. | ............. 162/135 |
| 2006/0060814 | A1 * | 3/2006 | Pawlowska et al. | ......... 252/8.83 |
| 2007/0133346 | A1 | 6/2007 | Jacobson et al. | |
| 2007/0169908 | A1 | 7/2007 | Jacobson | |
| 2007/0258315 | A1 | 11/2007 | Matula | |
| 2008/0011788 | A1 | 1/2008 | Jacobson | |

FOREIGN PATENT DOCUMENTS

| | | |
|---|---|---|
| FI | 110015 | 11/2002 |
| FR | 20060001232 | 8/2007 |
| WO | 03074788 | 9/2003 |
| WO | 2006/008333 | 1/2006 |

OTHER PUBLICATIONS

Kenneth S. Suslick, The Chemical Effects of Ultasound, *Scientific American*, Feb. 1989, p. 80-86.

* cited by examiner

*Primary Examiner* — Mark Halpern
(74) *Attorney, Agent, or Firm* — Benjamin E. Carlsen; Michael B. Martin (57) ABSTRACT

The invention provides a method and apparatus for optimally feeding an ASA emulsion into a papermaking process. An intense transmission of ultrasonic energy rapidly and efficiently forms an ASA emulsion. Nearly simultaneous to forming the emulsion, the emulsion is fed into a high-speed dual conduit feeding apparatus, which quickly mixes the ASA emulsion with other chemicals and feeds the mixture directly into a papermaking process. The invention operates so fast that virtually no hydrolysis of the ASA occurs. This both prevents damage to the papermaking machinery and improves the quality of the produced paper. The invention operates 10-20 times faster than mechanical based emulsion methods and requires ⅟₇ as much energy to operate. The invention also self-monitors the process and can automatically correct any detected problems with the fed ASA emulsion.

13 Claims, 6 Drawing Sheets

ASA EMULSIFICATION WITH ULTRASOUND

CROSS-REFERENCE TO RELATED APPLICATIONS

This application is a continuation in part of U.S. patent application Ser. No. 11/779,068 filed Jul. 17, 2007 now U.S. Pat. No. 7,785,442, which in turn is a continuation in part of Ser. No. 11/339,169 filed on Jan. 25, 2006 now U.S. Pat. No. 7,550,060 both of which are herein incorporated by reference in their entirety.

STATEMENT REGARDING FEDERALLY SPONSORED RESEARCH OR DEVELOPMENT

Not Applicable.

BACKGROUND OF THE INVENTION

The present invention relates to method and apparatus for essentially simultaneously emulsifying and feeding alkenyl succinic anhydride (ASA) into a process stream of a papermaking process. ASA is a papermaking additive, which enhances a number of hydrophobic paper properties. Because ASA is insoluble oil, it must be emulsified prior to introduction to a papermaking process. Currently a number of technologies are used to facilitate the emulsion of ASA in papermaking processes.

In order to adequately emulsify ASA for a papermaking process, two requirements must be met. First, the resulting emulsion must impart on the produced paper good sizing properties. Second, the emulsion must also be easily runnable through papermaking machines. One currently known manner of producing ASA emulsifications involves using mechanical emulsion methods but it is not an efficient manner of forming the emulsion.

Furthermore, optimal introduction of ASA into a process stream occurs when there is a rapid mixing of the ASA with other chemicals into the process stream, in the presence precise stoichiometric conditions with minimal water usage and in and optimal residence and contact times with other chemicals. As a result, mixtures containing ASA and other chemicals should be introduced after the various reagents have had enough time to take effect but not too long to maintain the desired effect. Because current methods of emulsifying ASA do not optimally feed the emulsion into a product stream and because they do not efficiently address the two requirements inherent with ASA emulsions, there remains a need for an improved method of producing ASA emulsions and efficiently introducing them into the papermaking process.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment is directed towards a method and apparatus for substantially simultaneously emulsifying and feeding ASA into a process stream of a papermaking process. The ASA is pre-mixed with water-diluted emulsifier (e.g. polymer or starch) at predetermined conditions (e.g. dosage, concentration), and the pre-mixed solution is then emulsified with an ultrasonic processor in a continuous mode. Essentially simultaneously, the ready emulsion is fed through a feeder into papermaking process. The emulsion can be fed into the wet-end of a papermaking process.

BRIEF DESCRIPTION OF THE DRAWINGS

A detailed description of the invention is hereafter described with specific reference being made to the drawings in which.

DETAILED DESCRIPTION OF THE INVENTION

For purposes of this application the definition of these terms is as follows:

"ASA" means alkenyl succinic anhydride.

"Cavitation" is the formation growth, and implosive collapse of vacuum bubbles in a liquid.

"Distal" means subsequent to a particular step in a sequential process.

"Emulsion" means a liquid mixture in which a dispersed phase liquid, which is otherwise immiscible within a continuous phase liquid, is effectively distributed throughout the continuous phase liquid by means of some chemical and/or process.

"Papermaking process" means a method of making any kind of paper products (e.g. paper, tissue, board, etc.) from pulp comprising forming an aqueous cellulosic papermaking furnish, draining the furnish to form a sheet and drying the sheet, and may also include a pulping stage.

"Proximal" means prior to a particular step in a sequential process.

"Pulping stage" means an optional stage in a papermaking process comprising. making pulp from wood and/or non-wood raw material and optionally bleaching the pulp to improve its brightness.

"Sheet" refer to relatively thin layers of paper precursors formed as a result of or during a papermaking process.

"Sizing" means a papermaking process for reducing the hydrophilic nature of cellulose in paper to increase its resistance to penetration by printing or writing ink.

"Ultrasonic emulsification" and "ultrasound emulsification" refer to a method of producing an emulsion by high-frequency sound waves that is believed to be governed by the cavitation effect.

"Wet-end" refers to that portion of a papermaking process involving an approach system, a sheet forming section and/or a pressing section.

ASA is commonly added to papermaking processes in order to improve the sizing properties of the resulting paper. ASA is typically added in the form of an emulsion. An ASA emulsion can comprise ASA in combination with one, some or all of an emulsifier, water, a surfactant, and/or a stabilizing agent. Examples of commonly used emulsifiers are polymers, liquid starch, and cooked starch. An example of a commonly used stabilizing agent is a surfactant.

In at least one embodiment, an ASA emulsion is prepared and fed into a papermaking process by adding it expeditiously under controlled conditions according to various predetermined sizing emulsion chemistries and schemes to control the water absorption and bulk of the resulting paper. The controlled conditions include precisely controlling the time that various chemicals and compositions are in or out of contact with each other, and the time between ultrasonically forming an ASA emulsion and feeding the emulsion into a product stream. Because ASA is strongly reactive with water this efficient preparation of an ASA emulsion is optimally introduced to avoid hydrolysis and the formation of hydrolysates.

One prior art technology described in European Patent EP O961856, is to use mechanical emulsification, which produces the emulsion by through the use of a rotor or stator. Mechanical emulsion involves passing ASA and polymer (starch) mixtures through a high-speed, high-shear turbine pump. However, the due to the unavoidable presence of abrasive contaminants in ASA bearing mixtures, high shear activities cause wear and tear on equipment which decreases the effective lifespan of emulsifying equipment. In addition, to be effective, ASA emulsions commonly have particles sizes of between 0.5 µm to 5 µm. Interactions between ASA and other agents commonly added during the papermaking process inhibit the formation of particle within this range. This inhibition can only be overcome with the use of high powered shearing which further increases harmful abrasions, increases temperatures, and requires more energy. This inhibition can also be overcome by the use of stronger emulsifying agents, but these stronger emulsifying agents often reduce the sizing properties of the ASA emulsion.

One alternative to mechanical emulsification is ultrasonic emulsification. Ultrasonic emulsification has few parts subject to abrasion, does not excessively increase temperature, and requires less energy than mechanical emulsification. Without being limited to theory or design, it is believed that ultrasonic emulsification is the result of a "cavitation effect" which is defined as follows: When sonicated at high intensities by sound waves, liquids alternate between a high pressure cycle (compression) and a low pressure cycle (rarefaction). The rates of these cycles depend on frequency. When in a low pressure cycle, high intensity ultrasonic waves create voids in the liquid. When the voids grow too large they can no longer absorb energy and collapse violently during a high pressure cycle. This cavitation effect causes surface erosion and size reduction in large particle in the liquid and is an effective manner for forming emulsions. The cavitation effect also causes moderate temperature increases.

One example of the ultrasonic emulsification of ASA is in French Patent Application Registration Number 06 01232. However in order for an ultrasonic emulsification to be optimal, it must also be introduced optimally into the product stream of a papermaking process. This optimal introduction characterizes rapid, efficient introduction in a manner that makes the ASA emulsification highly effective in the papermaking process.

Figure 1:
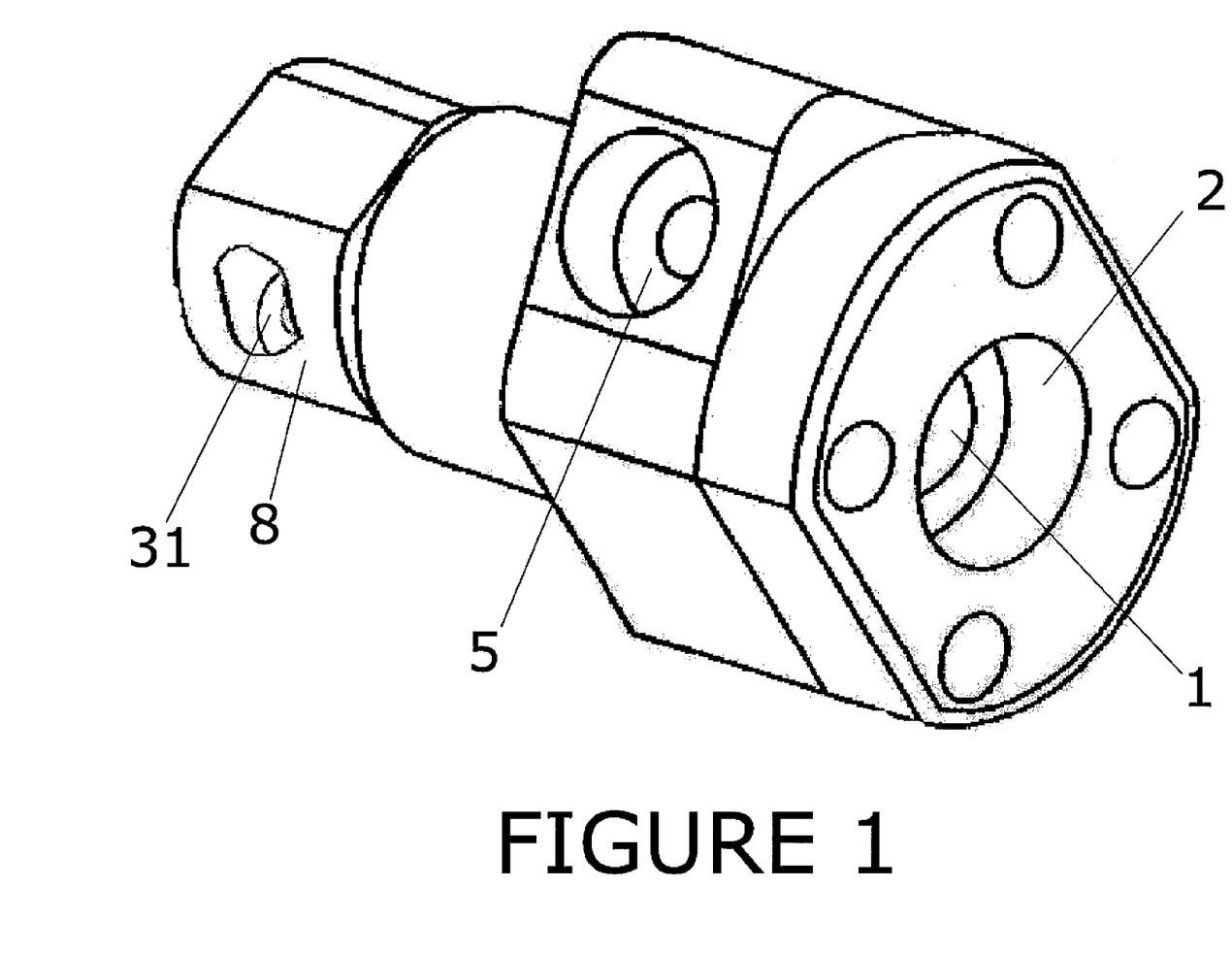
FIG. 1 is a perspective view of an apparatus for feeding an ASA emulsification into a papermaking process.
Figure 2:
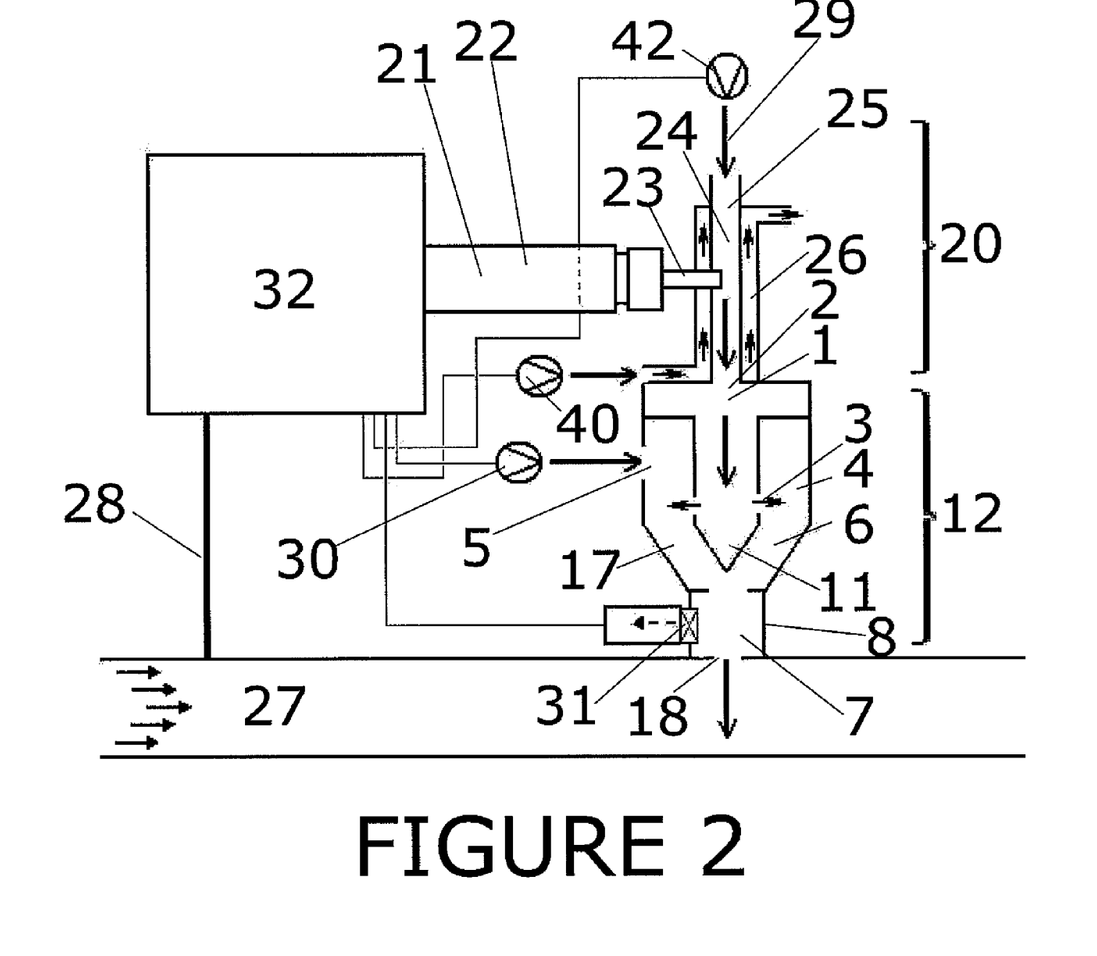
FIG. 2 is a representative view of an emulsification and feeding apparatus.

Referring now to FIGS. 1 and 2 there is shown a feeding apparatus (12) that can optimally introduce an ASA emulsification into a papermaking process. The apparatus includes: a first conduit (1); a second conduit (4); and a mixing chamber (7). The dimensions and geometries of each element of the apparatus depends upon how much ASA or other chemicals need to be added to the papermaking process, as well other factors, such as the construction of the papermaking apparatus. The feeding apparatus (12) may be made of any suitable material for handling various types of papermaking chemicals, for example, stainless steel.

The first conduit (1) has one or more inlets (2) and outlets (3) and the second conduit (4) has one or more inlets (5) and outlets (6). An ASA emulsification can be fed into at least one first conduit inlet (2) and/or at least one second conduit inlet (5). In at least one embodiment, the first conduit (1) has both a head portion (10) and a portion (11) that is conical in shape. The second conduit (4) is secured to the first conduit's head portion (10). The mixing chamber (7) has one or more inlets (17) and outlets (18) that are in fluidic communication with the outlets of both the first conduit (1) and the second conduit (4). The mixing chamber (7) can be secured to the second conduit (4).

In at least one embodiment an adaptor (8) is secured to the mixing chamber (7) and is in communication with an outlet (31) of the mixing chamber (7). The adaptor outlet (31) facilitates the removal of mixtures formed in the feeding apparatus (12) for analysis. Such analysis includes but is not limited to temperature, particle size, pH, and purity.

The adaptor (8) may secure to the mixing chamber (7) by any fastening means that would be appreciated by one of ordinary skill in the art, for example, at least a portion of the mixing chamber (7) may insert into the adaptor (8). In at least one embodiment, the inlets (5) of the second conduit (4) are perpendicular to the outlets of the second conduit (4). In at least one embodiment, the first conduit (1) traverses the second conduit (4) perpendicular to the inlets (5) of the second conduit (4).

In fluidic communication to the feeding apparatus (12) is an ultrasonic emulsifier (20). The ultrasonic emulsifier (20) comprises a sonotrode (23) and a sonotrode flowcell (4). The sonotrode flowcell (24) receives a crude emulsion (29) comprising a mixture of neat ASA in combination with one, some or all of an emulsifier, water, a surfactant, and/or a stabilizing agent. An intensive burst of ultrasonic energy from the sonotrode (23) is transmitted to the crude mixture while it is within the in the sonotrode flowcell (24). In at least one embodiment the ultrasonic emulsifier (20) also comprises a transducer (21) and a booster (22). The transducer (21) transfers supplied power into mechanical oscillations. The supplied power is typically electrical power. The booster (22) modulates (increases and decreases) the amplitude and frequency of the mechanical oscillations. The sonotrode (23) transfers oscillations to the sonotrode flowcell (24).

In at least one embodiment, an ultrasonic processor (21) controls the various parts of the inventive device including but not limited to the ultrasonic emulsifier (20). The processor can also regulate the environment within sonotrode flowcell (24). This control includes the rate of entry of crude ASA emulsion (29) into the sonotrode flowcell (24), the activation of an ASA feed pump (42), the rate of exit of ultrasonically emulsified ASA into the feeding apparatus (12), the duration, intensity, pattern, frequency, and amplitude of the ultrasonic transmission, the temperature of the ASA emulsion, and any or all of the pumps that feed various fluids into various components of the inventive device. In at least one embodiment the frequency is calibrated to 20 kHz. In at least one embodiment the frequency may go up to as high as 24 kHz or higher.

In at least one embodiment, the temperature of the ASA emulsion is at least in part regulated by a tube (25) passing through the sonotrode flowcell (24), which is surrounded by a regulating channel (26). A fluid (such as water from a fluid source or pipe (40)) passes through the regulating channel (26) to influence the temperature within the tube (25). The tube (25) can be constructed out of a heat conducting material such as glass and the fluid in the regulating channel (26) can flow in a direction opposite that of the tube (25) to maximize heat transfer. In at least one embodiment, the ultrasonic processor (32) can be constructed and arranged to automatically alter the environment within the sonotrode flowcell (24) based on data received from one or more devices performing analysis of the contents of the outlet port (31). In particular, the ultrasonic processor (32) can modulate the ultrasonic transmission in response to the measured particle size.

In at least one embodiment the feeding apparatus (12) is designed to change the temperature of the ASA emulsification from one ideal for forming the emulsification to one ideal for use in the papermaking process. One way this can be accomplished is by feeding the ASA emulsification into a first conduit (1) of which at least a portion of which traverses the second conduit (4). This design allows fluid within the second conduit (4) to induce a temperature change in the ASA emulsion prior to its coming into contact with the contents of the second conduit (4).

In at least one embodiment the first conduit (1) has a head portion (10) that does not traverse said second conduit (4) and a portion that traverses said second conduit (4). The portion (11) that traverses the second conduit (4) is conical in shape and the point of the first conduit (1) is in fluidic communication with the mixing chamber (7). Fluids from the first conduit (1) and the second conduit (4) when free to intermix, form a rapidly moving vortex in the mixing chamber (7). This rapidly flowing and efficient mixing of the fluids in the first (1) and second (4) conduits simulates a shear effect which maintains/enhances the ultrasonically formed ASA emulsion. Because it mixes the two fluid sources together so quickly, the mixture can be fed into a papermaking process nearly simultaneous to the formation of the ASA emulsion and long before the emulsion dissipates.

In at least one embodiment, the co-feeding of various chemicals including an emulsion of ASA into a process stream (13) can be optimally achieved by the following steps: at least two chemicals (one of which is an ultrasonic ASA emulsion) are fed into the feeding apparatus (12), allowing a rapid mixture of the different chemicals to form, and rapidly dispensing the mixture into a process stream (13); or by aligning a series of feeding apparatuses (12) and dispensing chemicals. Chemicals including emulsified ASA may be added to the system in any order prescribed by a person of ordinary skill in the art. For example, chemicals may be added sequentially, simultaneously or in pre-programmed order from one or more feeding apparatuses.

In at least one embodiment the adaptor (8) is directly engaged to the wall of a process pipe (27) through which various components of a papermaking process are passing. The adaptor (8) can be positioned anywhere in a papermaking process. In at least one embodiment, the chemical fed into the conduit that the ASA emulsification is not fed into is a feed liquid such as water or starch solution and or may be another sort of liquid including but not limited to fresh water, purified process water from a mill, thin stock water, alum, clarified white water, cationic polymer starch, white water, and any combination thereof.

In at least one embodiment, the feeding apparatus (12) is above the entry into the papermaking process, the sonotrode flow cell (24) is above the feeding apparatus (12), and the sonotrode (23) and/or the ultrasonic processor (32) is astride the sonotrode flow cell (24). Although this arrangement uses gravity to accelerate the flow of chemicals into the papermaking process, it potentially leaves the sonotrode (23) and/or the ultrasonic processor (32) protruding outward from the sonotrode flow cell (24). In at least one embodiment, a supporting member (28) supports at least one protruding component of the invention. The supporting member can be engaged to the same process pipe (27) that the feeder feeds the ASA emulsification into.

While mechanical emulsion devices commonly have the ASA emulsion dwell in contact with a feed liquid for as much as 10-60 seconds before it is discharged into a papermaking process, the inventive method and apparatus can discharge an ASA emulsion into a papermaking process after a mere 0.1 to 0.3 seconds. This is rapid enough to prevent all but a negligible amount of agglomeration and hydrolyzing from occurring. In addition the inventive method and apparatus can produce a mean particle size of between 0.6 µm and 1.2 µm with less than 10% of the emulsion having a particle size of over 2 µm. The lack of a large proportion of the ASA having a particle size greater than the desired range is important because if the particles become too large, they will not be retained by the paper fibers, and will instead pass through the papermaking process and can hydrolyze and detrimentally deposit on papermaking equipment.

How much of the ASA emulsion is added to a papermaking process, including the ratio between the ASA emulsion components, depends on various factors, which would be appreciated by one of ordinary skill in the art. For example, factors such as the type of papermaking process, e.g. paper or board, may impact the amount of chemicals added to a papermaking process. In at least one embodiment, the ASA emulsion is added in the range 500-1500 grams/ton (g/tn) (as product) for paper machine and for board machine in the range 1000-3500 g/tn.

Figure 3:
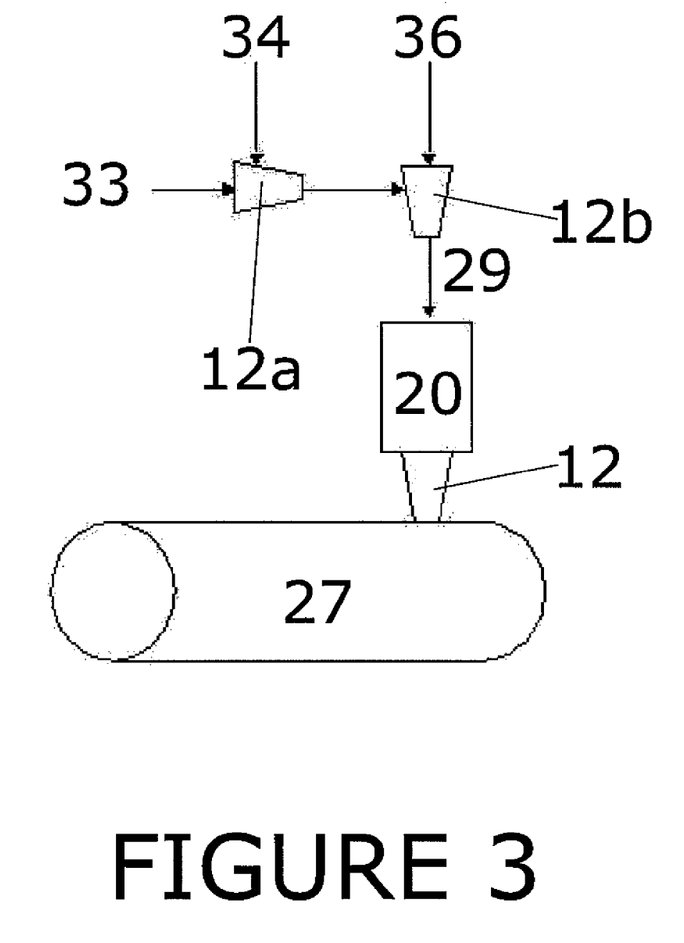
FIG. 3 is a representative illustration of an apparatus for manufacturing a sizing emulsion.

Referring now to FIG. 3 there is shown a method and apparatus for pre-mixing the ASA into a crude emulsion before passing it on to an ultrasonic emulsifier (20). In at least one embodiment at least two pre-mixing devices (12a, 12b) are serially positioned. One or more of these mixing devices can be the same type of feeding apparatus previously described (12 in FIG. 1) or they can be mechanical mixers or any other mixing device known in the art. An emulsifier (33) and feeding fluid (34) are added into a first mixing device (12a) and the resulting first mixture (35) is then fed into a second mixing device (12b). Neat ASA (36) is also fed into the second mixing device (12b), which produces a crude ASA emulsion (29). The crude ASA emulsion (29) is then fed into an ultrasonic emulsifier (20) as previously described. The ultrasonic emulsifier (20) then either feeds directly into a papermaking process (for example into a process pipe (27)), or is fed into a third mixing device in the manner described in FIG. 2.

The inventive ultrasonic emulsification makes it possible to produce similar emulsification results at lower energy consumption than a rotor/stator emulsification can. This is because the cavitation effect has lower power requirement than high-shear forces effect, that govern the rotor/stator effect. In one case an effective ASA emulsion was formed at an energy cost of 1 KW while the equivalent emulsion formed with a mechanical emulsion apparatus had an energy cost of 7 KW.

Ultrasonic processor and feeder method is simple, robust and easy to run and maintain compared to conventional emulsification and conventional feeding. Also, the installation location is more flexible, i.e. it can be installed on the process pipe at the desired position for best sizing effect. The simplicity of the equipment makes it possible to produce it at lower costs than the rotor/stator emulsification equipment. In addition the rapid feeding reduces bulkiness in the produced paper.

In at least one embodiment, the apparatus for ultrasonic emulsification and feeding apparatuses continuously collect samples of the diluted ASA emulsion prior to its discharge into the papermaking process. This enables on-line monitors to control the emulsion quality. Monitoring can be obtained through on-line particle size measurement. Based on the measurement, the set points for power and amplitude can be given to maintain the sizing emulsion quality. This online monitoring can be integrated with online monitoring of other aspects of the papermaking process. The online monitoring and processor control can also direct one or more of the pumps that control the flow of various fluid streams.

EXAMPLES

The following examples are presented to describe embodiments and utilities of the invention and are not meant to limit the invention unless otherwise stated in the claims:

The example was obtained during full-scale production run of a paper machine. To meet the target sheet water absorbency values expressed as grams of absorbed water per square meters within 60 seconds (measured with a Cobb60 test according to ISO 535 standards), the required dosage of sizing chemical ASA was approximately 600 grams as product per ton of paper produced. The emulsifying chemical was cationic polyacrylamide and no surfactant was used. For the given ASA flow rate, the conventional rotor/stator emulsification method was compared to ultrasonic emulsification method. After the emulsification, the emulsion was diluted with fresh water and discharged to the process pipe with thin stock furnish (mass consistency less than 1%) after approximately 20 seconds for both methods. For the ultrasonic emulsification, the ASA concentration, ASA/polymer ratio and process conditions of the ultrasonic processor were optimized in advance.

Figure 4:
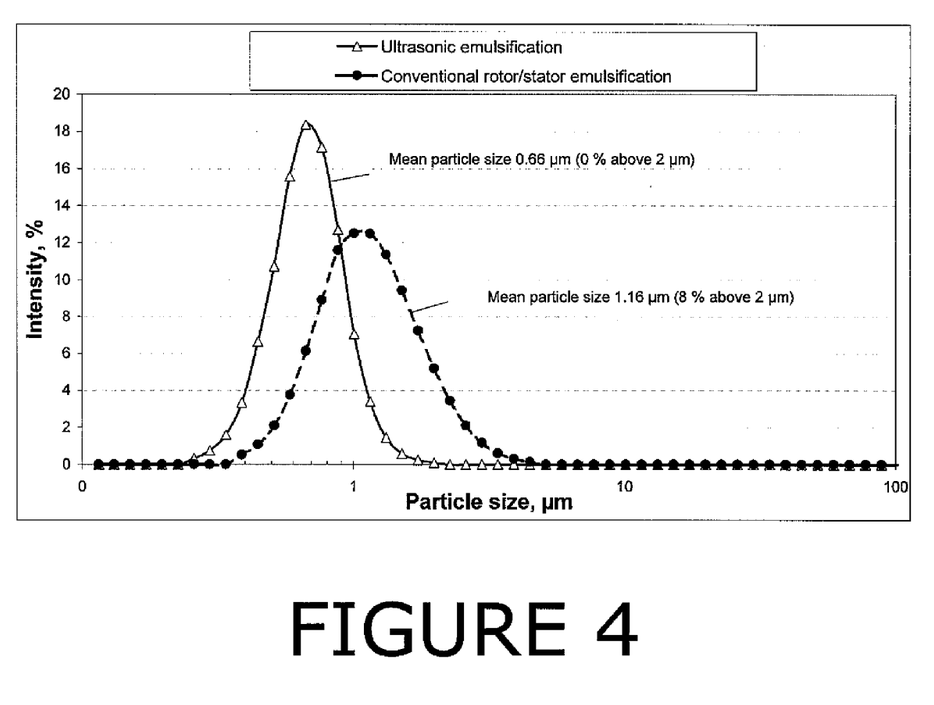
FIG. 4 is graph contrasting ultrasonic emulsification with mechanical emulsification.
Figure 5:
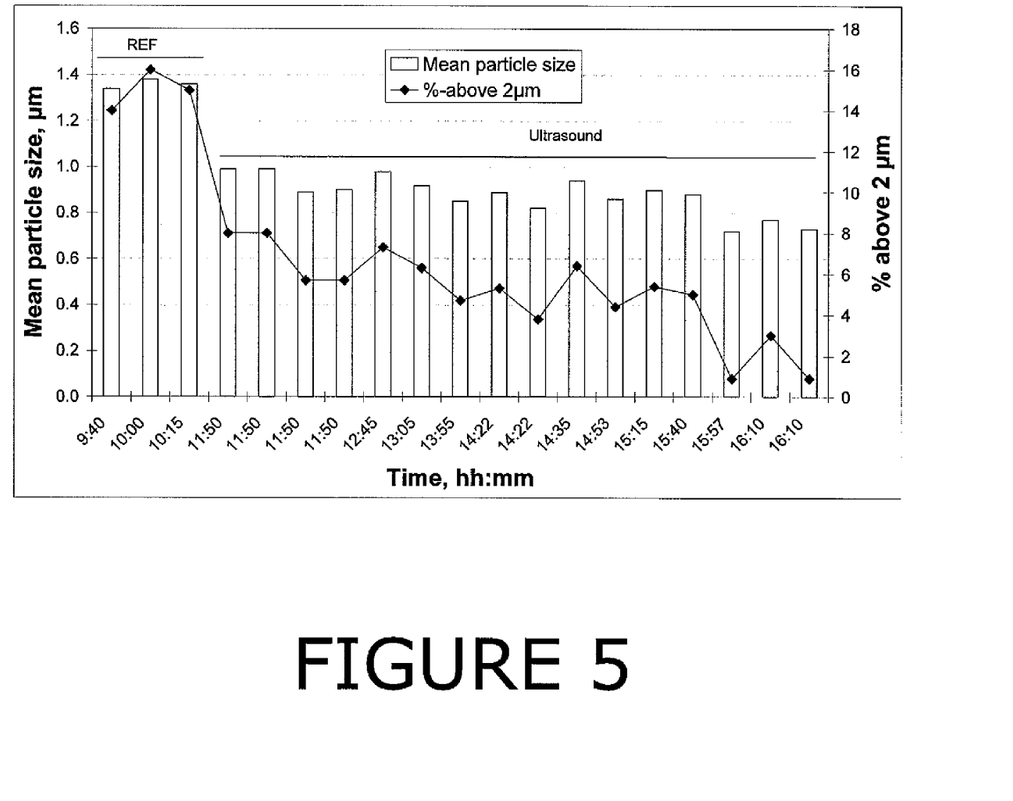
FIG. 5 is a graph displaying particle sizes of ultrasonic emulsifications.

FIG. 4 shows that a comparison between the ultrasonic emulsification versus current and conventional rotor/stator emulsification in terms of emulsion's particle size distribution for a given and constant flow rate of the solution to be emulsified. The particle size distribution was measured with HORIBA LA-300 Laser Scattering Particle Size Distribution Analyzer. FIG. 5 shows the mean particle size and percentage above 2 μm of the emulsion produced by conventional rotor/stator method (REF) and ultrasonic emulsification as a function of time during a paper machine production trial. FIG. 5 also shows that the Cobb60-water absorbency test of paper sheet as a function of time during a paper machine production trial. The sizing emulsion in the trial was produced by conventional rotor/stator method and ultrasonic emulsification. The Cobb60 test was measured according to standard ISO 535.

Figure 6:
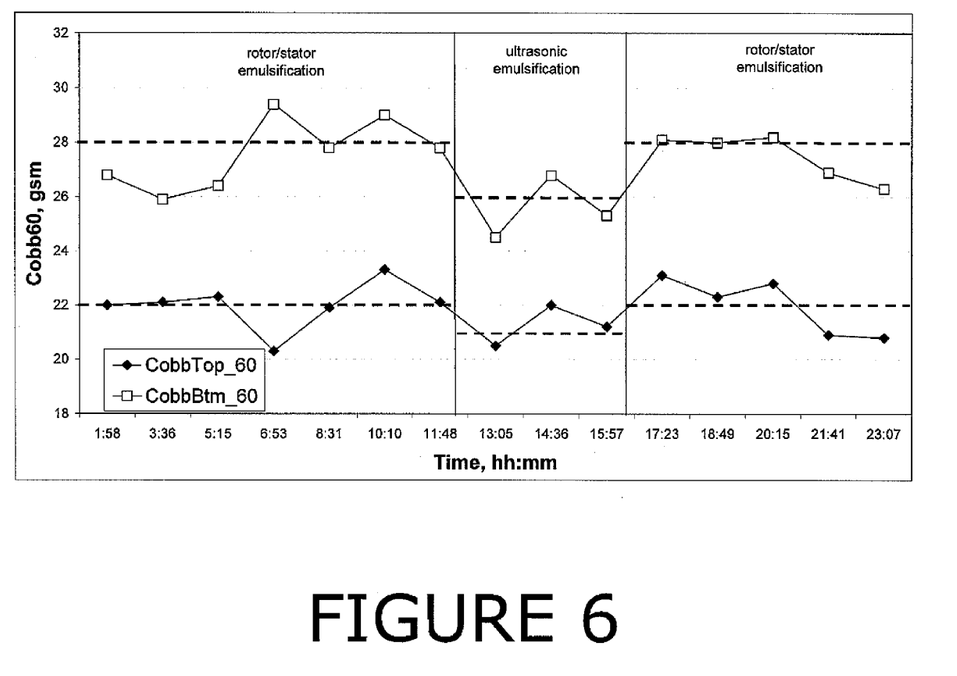
FIG. 6 is a graph comparing particle sizes of ultrasonic emulsifications with those of mechanical emulsifications.

FIGS. 4 and 5 together show that the ultrasonic emulsification produced smaller particles with a narrower size distribution than the conventional rotor/stator method. As a result of improved sizing emulsion quality, the produced sheet's water absorbency test result followed the same trend. In other words, the sheet produced with ultrasonic emulsified sizing emulsion showed approximately 5% improvement on the average (top/bottom) in Cobb-values than the conventional rotor/stator method shown in FIG. 6. Since the distance time of 20 seconds from the dilution of the sizing emulsion to the discharge may have some negative impact on emulsion stability and hydrolysis in both emulsification methods, by implementing the invention disclosure in concern (i.e. emulsification and essentially simultaneously feeding), it is believed that even better results would be produced by minimizing the time from the emulsification to discharge.

Wile this invention may be embodied in many different forms, there are shown in the drawings and described in detail herein specific preferred embodiments of the invention. The present disclosure is an exemplification of the principles of the invention and is not intended to limit the invention to the particular embodiments illustrated. Furthermore, the invention encompasses any and all possible combinations of some or all of the various embodiments described herein. Any and all patents, patent applications, scientific papers, and other references cited in this application are hereby incorporated by reference in their entirety.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of feeding an alkenyl succinic anhydride emulsion into a papermaking process comprising: essentially simultaneously manufacturing the emulsion and feeding the emulsion into a process pipe in the wet-end of a papermaking process with papermaking furnish having an intrinsic mass consistency of between 0.1%-5% wherein the step of manufacturing the alkenyl succinic anhydride emulsion is by transmitting ultrasonic waves into a lumen containing alkenyl succinic anhydride and at least one liquid which becomes the continuous phase liquid of the emulsion.

2. The method of claim 1 further comprising the steps of:
   a) providing one or more feeding apparatuses, each feeding apparatus comprising:
      a first conduit having one or more inlets and outlets;
      a second conduit having one or more or more inlets and outlets, wherein the first conduit secures to the second conduit and traverses the second conduit;
      a mixing chamber that has one or more inlets and outlets, wherein the second conduit secures to the mixing chamber and wherein the outlets of the first conduit and the outlets of the second conduit are in fluid communication with the mixing chamber; and
      an adaptor that is in fluid communication with the outlet of the mixing chamber and is secured to the mixing chamber;
   b) mounting at least one feeding apparatus containing an adaptor over an opening in the process pip,
   c) introducing the alkenyl succinic anhydride emulsion and one or more chemicals into the mixing chamber of the feeding apparatus by introducing the alkenyl succinic anhydride emulsion or one or more chemicals into the inlets of the first conduit and the second conduit, the alkenyl succinic anhydride emulsion being introduced nearly simultaneous to its ultrasonic manufacture;
   d) mixing the alkenyl succinic anhydride emulsion and one or more chemicals in the mixing chamber of the feeding apparatus to form a mixture; and
   e) dispensing the mixture into the process stream through the adaptor of the feeding apparatus that is in communication with the process stream.

3. The method of claim 2 wherein the adaptor further comprises a testing outlet, the testing outlet having a sealable valve constructed and arranged to desirably allow a sample of the mixture formed in the mixing chamber to be removed,
the method further comprising the steps of:
removing a sample of the mixture via the testing outlet, and measuring at least one attribute of the mixture from the list consisting of particle size, temperature, pH, concentration, purity, and any combination thereof.

4. The method of claim 3, further comprising the step of providing a processor, the processor constructed and arranged to modulate at least one attribute in the lumen selected from the list consisting of the frequency of the transmitted ultrasonic waves, the amplitude of the transmitted ultrasonic waves, the flow rate into the lumen, the flow rate out of the lumen, the temperature of liquid in the lumen, and any combination thereof.

5. The method of claim 4, in which the processor is constructed and arranged to receive input data of at least one measured attribute of the sample of the mixture and to automatically modulate at least on attribute in the lumen in response to the input data.

6. The method of claim 4, in which the processor automatically modulates the transmitted ultrasonic waves in response to the measured particle size of the sample of the mixture.

7. The method of claim 3, further comprising the step of providing a first mixing machine, the first mixing machine constructed and arranged to receive and mix at least two liquid streams and transfer the mixture of the two liquid streams into the lumen, at least one liquid stream contains alkenyl succinic anhydride, the mixture of the two liquid streams results in an alkenyl succinic anhydride dosage optimal for forming an ultrasonic alkenyl succinic anhydride emulsion.

8. The method of claim 7, in which the liquid stream containing alkenyl succinic anhydride is neat alkenyl succinic anhydride.

9. The method of claim 7, further comprising the step of proving a second mixing machine, the second mixing machine constructed and arranged to receive and mix at least two liquid streams and transfer the mixture into one of the two liquid streams received by the first mixing machine.

10. The method of claim 9, in which the one of the liquid streams received by the second mixing machine contains an emulsifier, and the other liquid stream received by the second mixing machine contains a feeding liquid.

11. The method of claim 9, in which at least one of the mixing machines is at least one item selected from the list consisting of a mechanical mixer and a feeding apparatus.

12. The method of claim 9, in which the emulsifier is a polymer or starch.

13. The method of claim 9, in which the feeding liquid is water or starch.

* * * * *